(12) United States Patent
Chandra

(10) Patent No.: US 7,702,186 B1
(45) Date of Patent: Apr. 20, 2010

(54) CLASSIFICATION AND RETRIEVAL OF DIGITAL PHOTO ASSETS

(75) Inventor: Manish Chandra, Fremont, CA (US)

(73) Assignee: Kaboodle, Inc., Sunnyvale, CA (US)

( * ) Notice: Subject to any disclaimer, the term of this patent is extended or adjusted under 35 U.S.C. 154(b) by 1038 days.

(21) Appl. No.: 11/377,088

(22) Filed: Mar. 15, 2006

Related U.S. Application Data

(60) Provisional application No. 60/662,322, filed on Mar. 15, 2005.

(51) Int. Cl.
*G06K 9/32* (2006.01)

(52) U.S. Cl. .................. 382/305; 382/165; 382/278; 707/3; 707/6

(58) Field of Classification Search ............. 382/165, 382/278, 305; 707/3, 6
See application file for complete search history.

(56) References Cited

U.S. PATENT DOCUMENTS

| | | | | |
|---|---|---|---|---|
| 5,870,771 A * | 2/1999 | Oberg | ..................... | 715/202 |
| 6,580,252 B1 * | 6/2003 | Yu | ..................... | 323/222 |
| 6,590,608 B2 * | 7/2003 | Matsumoto et al. | ..... | 348/231.2 |
| 6,640,145 B2 * | 10/2003 | Hoffberg et al. | ............. | 700/83 |
| 6,930,707 B2 * | 8/2005 | Bates et al. | ................. | 348/78 |
| 7,006,881 B1 * | 2/2006 | Hoffberg et al. | ............. | 700/83 |

* cited by examiner

*Primary Examiner*—Yosef Kassa
(74) *Attorney, Agent, or Firm*—Jeffrey Brill; Brill Law Office

(57) ABSTRACT

A digital image manager classifies digital images such as digital photographs for efficient retrieval. The digital image manager assigns a when value, a where value, a who value and a why value to digital images. Much of the value assignment process is automated to make digital image management easy for the user. The digital image manager classifies the digital images according to the assigned property values. The user subsequently enter search requests for digital images meeting desired criteria. The digital image manager uses the assigned values to locate and retrieve digital images that satisfy the user's request.

20 Claims, 1 Drawing Sheet

US 7,702,186 B1

CLASSIFICATION AND RETRIEVAL OF DIGITAL PHOTO ASSETS

PRIORITY CLAIM AND RELATED APPLICATION

This patent application claims the benefit of provisional application Ser. No. 60/662,322, titled "Web Research and Collaboration Process with Digital Photo Asset Classification and Retrieval," filed on Mar. 15, 2005, the entirety of which is hereby incorporated by reference.

TECHNICAL FIELD

This invention pertains generally to digital image management, and more specifically to automatic and efficient classification and retrieval of digital images.

BACKGROUND

Digital photography is becoming increasingly popular, and it is thus becoming more and more important for a user to be able to easily organize a large collection of digital photographs on a computer. There is a lack of usable structure provided by current organizational systems for digital photos, which use either labels or folders.

The foldering system of organization creates a many to one relationship between a picture and the folder it is stored in. Most digital pictures are automatically tagged with the date they were shot from the digital camera itself. So the chronological order is a natural order to organize the pictures. But, for example, if a picture is taken at the Statue of Liberty, New York, N.Y. and has John, Suzie and Jane in it, then putting it in a folder called John, Suzie, Statue or vacation will prevent it from being easily retrieved and require a full scan when trying to identify the pictures that are relevant.

The tagging system of organization overcomes the single box classification system but introduces a relatively large number of flat labels. This leads to a higher degree of freedom but increases the complexity of organization in the system. For example a tag, birthday party Fremont and a tag home Fremont, have overlapping metadata, and over time will make it harder for users to accurately retrieve the pictures. The tagging system puts undue onus on the user to organize the tags properly so that the pictures can be retrieved efficiently.

What is needed are methods, systems and computer readable media for organizing digital pictures in an efficient manner, such that a user can easily add metadata to pictures so that they can be retrieved efficiently.

SUMMARY OF INVENTION

Computer-implemented methods, computer systems and computer-readable media classify digital images such as digital photographs for efficient retrieval. A digital image manager assigns a when value, a where value, a who value and a why value to digital images. Much of the value assignment process is automated to make digital image management easy for the user. The digital image manager classifies the digital images according to the assigned property values. The user subsequently enter search requests for digital images meeting desired criteria. The digital image manager uses the assigned values to locate and retrieve digital images that satisfy the user's request.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
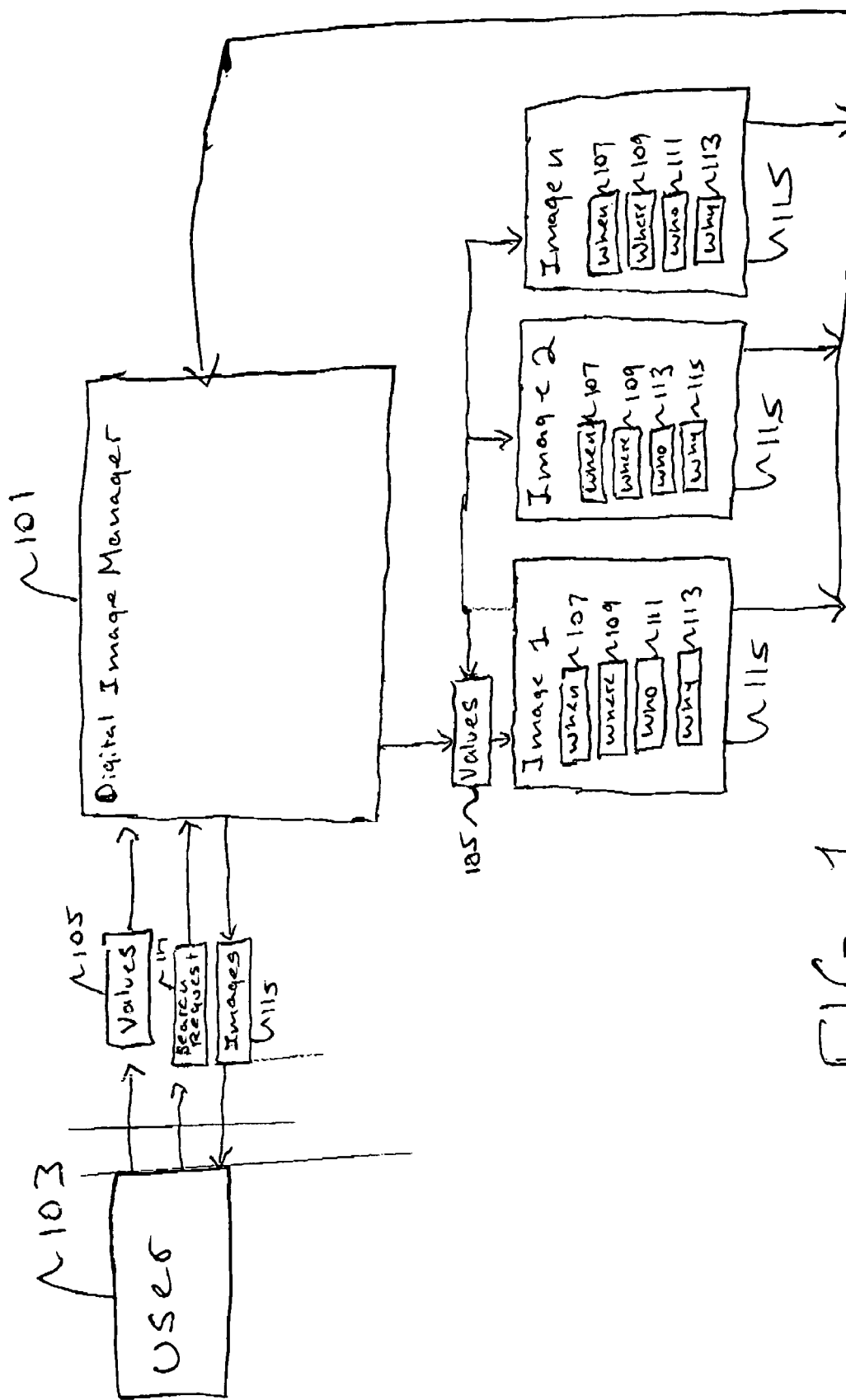
FIG. 1 is a block diagram illustrating a high level overview of the operation of a digital image manager, according to some embodiments of the present invention.

The FIGURE depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a digital image manager 101, according to some embodiments of the present invention. It is to be understood that although the digital image manager 101 is illustrated as a single entity, as the term is used herein a digital image manager 101 refers to a collection of functionalities which can be implemented as software, hardware, firmware or any combination of these. Where a digital image manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the digital image manager 101 allows a user 103 to enter the value 105 for four properties 107, 109, 111, 113 of any digital image 115: a when property 107, a where property 109, a who property 111 and a why property 113. These properties 107, 109, 111, 113 enable logical classification and subsequent retrieval of the digital images 115.

In one embodiment, the digital image manager 101 automatically defaults the when property 107 to the date 105 that the digital image 115 was created (e.g., the date that the picture was taken). The digital image manager 101 can display the automatically assigned date 105 to the user 103, who can edit the value 105 if need be. The digital image manager 101 can use different date formats in different embodiments, and can include additional information such as time where desired.

The digital image manager 101 prompts the user to enter a value 105 for the where property 109 for a logically associated set of digital images 115 (e.g., a set of digital photographs taken during a single session). The digital image manager 101 then sets the where property 109 to this value 105 for all the images 105 of the group. The digital image manager 101 can allow the user 103 to edit the value 105 for some or all of the additional digital images 105 in the group if desired. In one embodiment, the where property 109 consists of three parts: location; city; and state/country. Of course, in other embodiments the format of the where property 109 varies, and includes more, fewer and/or different fields.

As with the where property 109, the digital image manager 101 prompts the user to enter a value 105 for the who property 111 for a logically associated group of digital images 115. The digital image manager 101 sets the who property 111 to this value 105 for all the images 105 of the group. The user 103 can edit the value 105 where appropriate. In one embodiment, the who property 111 consists of a person's name. In some embodiments, additional optional values can be entered, e.g., year of birth, age, relationship, etc.

The why property 113 is also set to the same user 103 entered value 105 for any group of images 115 by default, and can also be user 103 edited for individual images 115 of the group. The why property 113 can comprise one of a list of default values 105 such as birthday, vacation, bar mitzvah, hike, field trip, wedding, etc. Of course, in other embodiments the format of the why property 109 varies as desired.

In some embodiments of the present invention, one or more additional properties are assigned values 105 to further classify the digital images 115. In some embodiments of the present invention, the formats and/or content of the four properties 107, 109, 111, 113 varies.

Various techniques can be utilized to minimize the amount of effort required from the user 103 in the assignment of values 105 to properties. For example, in one embodiment the digital image manager 101 interface displays an auto-complete button for each property (not illustrated) that automatically pre-fills the value 105, for example from a list of default values 105 or from previously entered values 105.

The digital image manager 101 utilizes the property values 105 assigned to the digital images 115 to enable efficient and easy image 115 retrieval. Users 103 can enter search requests 117 that include specific values 105 for images 115 they want to retrieve. The digital image manager then locates and retrieves images 115 with those values 105. For example, when the digital image manager 101 receives a search request 117 for digital images 115 with a specific value 105 for a when property 107, a where 109 property, a who property 111 and/or a why property 113, the digital image manager 101 searches for images 115 with the supplied values 105.

A search request 117 can also specify a group of values 105 for one or more property and/or a set of values 105 created by combining two or more values 105 with at least one Boolean operator, for one or more property. For the date when property 107, a search request 117 can specify a range of dates.

Of course, other possible combinations and variations of property value 105 specifications for search requests 117 and corresponding image retrieval are possible, and within the scope of the present invention. For example, in one embodiment the digital image manager 101 supports a keyword search. In that embodiment, the digital image manager 101 automatically maps the keywords supplied by the user 103 in the search request 117 to appropriate values 105 of one or more of the four properties 107, 109, 111, 113 and retrieves digital images 115 matching those values 105.

The present invention enables rapid classification of digital assets including photos, and allows efficient and organized retrieval based on the classification.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as program codes. As will be readily apparent to one of ordinary skill in the relevant art, any form of computer readable storage medium can be used in this context, such as magnetic or optical storage media, such that when the program codes stored on a computer readable medium are executed by a computer processor of a computing device, the computing device executes their associated functionality. As used herein, the term "computer readable storage medium" does not mean an electrical signal separate from an underlying physical medium. Additionally, as will be readily apparent to one of ordinary skill in the relevant art, software portions of the present invention can be instantiated (for example as object code or executable images) within the memory of any programmable computing device, such that when the processor of the computing device processes the components, the computing device executes their associated functionality. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for classifying and retrieving digital images, the method comprising the steps of:
    assigning, by a computer, values to at least a when property, a where property, a who property and a why property for at least some of a plurality of digital images;
    receiving, by a computer, a search request for digital images meeting specific criteria;
    searching, by a computer, the plurality of digital images for digital images with property values that meet the specific criteria; and
    providing, by a computer, located digital images with property values that meet the specific criteria responsive to the search request.

2. The method of claim 1 wherein assigning, by a computer, a value to the when property for a digital image further comprises:
    automatically assigning, by a computer, a date on which the digital image was created.

3. The method of claim 2 further comprising:
    displaying, by a computer, the automatically assigned when value to a user;
    receiving, by a computer, a change to the automatically assigned when value from the user; and
    updating, by a computer, the when value responsive to the received change.

4. The method of claim 1 wherein assigning, by a computer, a value to the where property for a digital image further comprises:
    prompting, by a computer, a user to enter the where value;
    receiving, by a computer, the entered where value from the user; and
    assigning, by a computer, the received where value to the digital image.

5. The method of claim 4 further comprising:
automatically assigning, by a computer, the received where value to a plurality of additional digital images which are logically associated with the digital image for which the user entered the where value.

6. The method of claim 5 further comprising:
displaying, by a computer, the automatically assigned where value to a user;
receiving, by a computer, a change to the automatically assigned where value from the user for at least one of the additional digital images; and
updating, by a computer, the where value of the at least one of the additional digital images responsive to the received change.

7. The method of claim 1 wherein assigning, by a computer, a value to the who property for a digital image further comprises:
prompting, by a computer, a user to enter the who value;
receiving, by a computer, the entered who value from the user; and
assigning, by a computer, the received who value to the digital image.

8. The method of claim 7 further comprising:
automatically assigning, by a computer, the received who value to a plurality of additional digital images which are logically associated with the digital image for which the user entered the who value.

9. The method of claim 8 further comprising:
displaying, by a computer, the automatically assigned who value to a user;
receiving, by a computer, a change to the automatically assigned who value from the user for at least one of the additional digital images; and
updating, by a computer, the who value of the at least one of the additional digital images responsive to the received change.

10. The method of claim 1 wherein assigning, by a computer, a value to the why property for a digital image further comprises:
prompting, by a computer, a user to enter the why value;
receiving, by a computer, the entered why value from the user; and
assigning, by a computer, the received why value to the digital image.

11. The method of claim 10 further comprising:
automatically assigning, by a computer, the received why value to a plurality of additional digital images which are logically associated with the digital image for which the user entered the why value.

12. The method of claim 11 further comprising:
displaying, by a computer, the automatically assigned why value to a user;
receiving, by a computer, a change to the automatically assigned why value from the user for at least one of the additional digital images; and
updating, by a computer, the why value of the at least one of the additional digital images responsive to the received change.

13. The method of claim 1 wherein receiving, by a computer, a search request for digital images meeting specific criteria further comprises:
receiving, by a computer, a search request for digital images with a specific value for at least one property from a group of properties consisting of a when property, a where property, a who property and a why property.

14. The method of claim 1 wherein receiving, by a computer, a search request for digital images meeting specific criteria further comprises:
receiving, by a computer, a search request for digital images with any of a group of values for at least one property from a group of properties consisting of a when property, a where property, a who property and a why property.

15. The method of claim 1 wherein receiving, by a computer, a search request for digital images meeting specific criteria further comprises:
receiving, by a computer, a search request for digital images with a set of values created by combining at least two values with at least one Boolean operator, for at least one property from a group of properties consisting of a when property, a where property, a who property and a why property.

16. The method of claim 1 wherein receiving, by a computer, a search request for digital images meeting specific criteria further comprises:
receiving, by a computer, a search request for digital images with a value within a range of dates for the when property.

17. The method of claim 1 further comprising:
receiving, by a computer, a search request for digital images based on at least one specified keyword;
automatically mapping, by a computer, the at least one specified keyword to at least one value for at least one property from a group of properties consisting of a when property, a where property, a who property and a why property; and
searching, by a computer, the plurality of digital images for digital images with the at least one mapped value.

18. The method of claim 1 further comprising:
assigning, by a computer, a value to at least one additional property for at least some of a plurality of digital images;
receiving, by a computer, a search request for digital images meeting specific criteria concerning at least the at least one additional property; and
searching, by a computer, the plurality of digital images for digital images with property values that meet the specific criteria.

19. At least one computer readable medium containing a computer program product for classifying and retrieving digital images, the computer program product comprising:
program code for assigning values to at least a when property, a where property, a who property and a why property for at least some of a plurality of digital images;
program code for receiving a search request for digital images meeting specific criteria;
program code for searching the plurality of digital images for digital images with property values that meet the specific criteria; and
program code for providing located digital images with property values that meet the specific criteria responsive to the search request.

20. A computer system for classifying and retrieving digital images, the computer system comprising:
a software portion configured to assign values to at least a when property, a where property, a who property and a why property for at least some of a plurality of digital images;
a software portion configured to receive a search request for digital images meeting specific criteria;
a software portion configured to search the plurality of digital images for digital images with property values that meet the specific criteria; and
a software portion configured to provide located digital images with property values that meet the specific criteria responsive to the search request.

* * * * *